Sept. 16, 1958 R. D. KUMMEL 2,852,165
DISCHARGE PORT CONSTRUCTION FOR SPREADER
Filed March 9, 1956 2 Sheets-Sheet 1
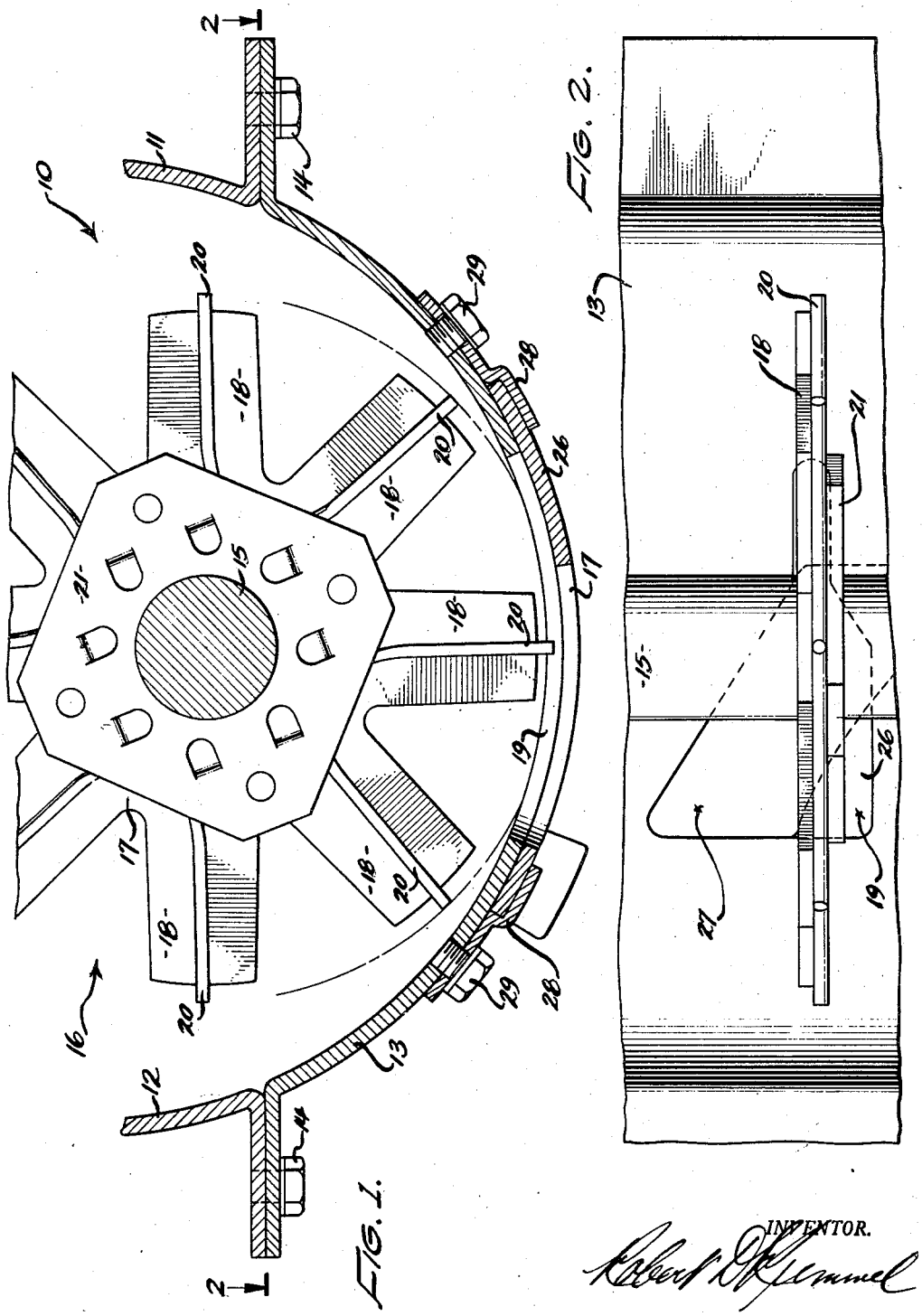
INVENTOR.
Robert D. Kummel Sept. 16, 1958  R. D. KUMMEL  2,852,165
DISCHARGE PORT CONSTRUCTION FOR SPREADER
Filed March 9, 1956  2 Sheets-Sheet 2

INVENTOR.
Robert D. Kummel

United States Patent Office 2,852,165
Patented Sept. 16, 1958

2,852,165

DISCHARGE PORT CONSTRUCTION FOR SPREADER

Robert D. Kummel, Santa Monica, Calif., assignor to J. I. Case Company, Racine, Wis., a corporation of Wisconsin Application March 9, 1956, Serial No. 570,468

7 Claims. (Cl. 222—310)

The present invention relates in general to fertilizer spreader constructions and more particularly to registrable discharge ports formed in the fertilizer hopper and cooperating shutter.

It is, therefore, a primary object of the present invention to provide a fertilizer spreader which will effect a uniform discharge of material.

A further object of the present invention is to provide a fertilizer spreader including a hopper-type container having a novel arrangement of discharge ports through which material is discharged.

Another object of the present invention is to provide a fertilizer spreader having registrable discharge ports and means in one of said ports for directing penetrating means across substantially the center of the width of this port.

With these and other objects in view, the invention may consist of certain novel features of construction and operation as will be more fully described and particularly pointed out in the description, drawings and claims appended hereto.

In the drawings:

Fig. 1 is a vertical cross-sectional view of a fertilizer spreader hopper construction embodying the principles of the present invention, with parts broken away.

Fig. 2 is a horizontal cross-sectional view taken on the line 2—2 of Fig. 1, with parts broken away.

Figure 3:
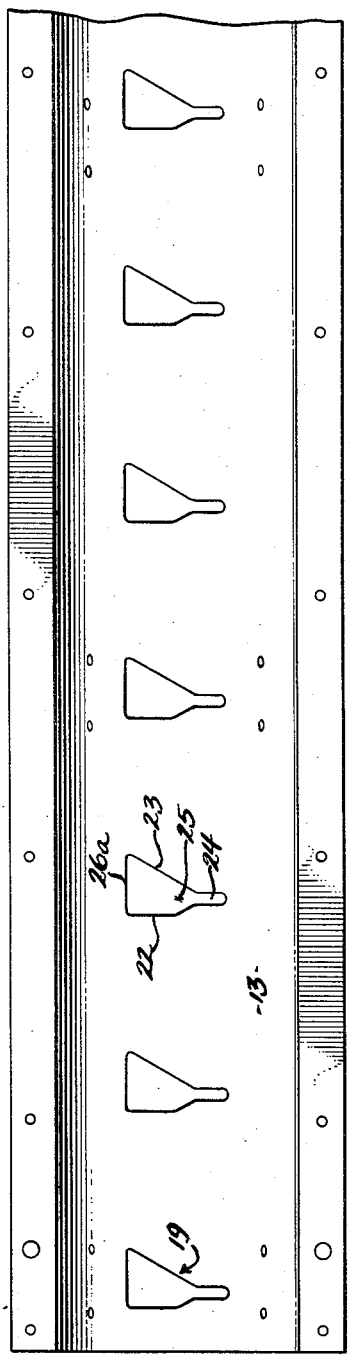
Fig. 3, is a plan view of a portion of the hopper bottom shown in Fig. 1, slightly reduced in size.

Referring particularly to Figs. 1 and 2 of the drawings which illustrate the principles of applicant's invention, a hopper, generally designated by the number 10, consists of a front wall 11, a back wall 12, and a hopper bottom 13 interconnected with the front and back wall by screws 14, the hopper bottom 13 being substantially semi-circular in cross section.

A rotatable shaft 15 is positioned in hopper 10, and rigidity fixed to the shaft so as to turn therewith are a plurality of disk-shaped members 16, only one of which is shown. Each of the members 16 comprises a disk member 17 formed of rigid sheet metal which has a plurality of radially extending arms 18. The arms 18 are so formed as to urge material in hopper 10 to charge or fill an associated discharge port 19 formed in hopper bottom 13. The path of travel of arms 18 about the axis of shaft 15 is eccentric with the curvature of hopper bottom 13, and the arms 18 are formed of such a length that they will not penetrate into port 19. Each of the arms 18 has an associated finger 20 which is formed of flexible spring wire and which extends beyond the end of its associated arm 18 a distance sufficient to penetrate into discharge port 19 upon rotation of shaft 15. Each of the fingers 20 extends toward the hub of member 17 and is suitably fixed with respect thereto by a suitable retainer disk 21.

It will be appreciated that the particular construction of disk-shaped members 16 forms no part of the present invention and is merely illustrative of means for alternately filling the hopper discharge port 19 and penetrating the port.

As previously suggested, a discharge port 19 is formed in hopper bottom 13 in association with each disk-shaped member 16. Each of the ports 19 is provided with a left-side edge 22 substantially parallel with the plane of member 16 and a right-side edge 23 which extends at an angle from the plane of member 16, and a guideway 24 which extends forwardly from a throat portion 25. It will be noted that guideway 24 opens into throat portion 25 at substantially the middle of the width of the port and assuming that member 16 is constrained to move in a clockwise direction as seen in Fig. 1, the guideway 24 is so located as to receive and accommodate the fingers 20 just prior to their entry into throat 25 and to guide the fingers 24 to move in a predetermined path through the port 19. As previously suggested, the fingers 20 are constrained to move through the port 19 to a path substantially midway between edge 22 and 23. The port 19 also has a back edge 26a which is so located as to be cleared by the fingers 20 upon their moving out of the port.

Figure 5:
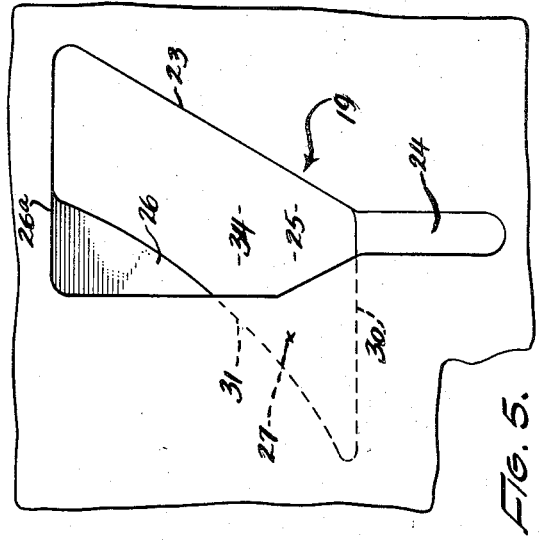
Fig. 5 is a view similar to Fig. 4 showing the maximum dispensing position.
Figure 4:
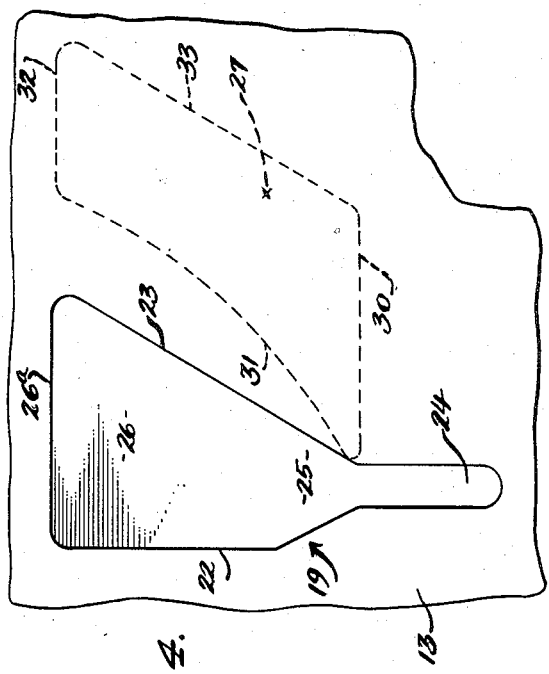
Fig. 4 is a fragmentary plan elevational view of the discharge port arrangement, showing the nondispensing position.

A shutter 26 is slidable along the bottom of the hopper bottom 13 and has formed therein a plurality of discharge openings or ports 27 which are registrable with the discharge ports 19. Suitable guides 28 are fixed to hopper bottom 13 by screws 29 for carrying and slidably supporting shutter 26 relative to hopper bottom 13. Each of the openings 27 includes a front edge 30 which is constrained to move in a path substantially normal to guideway 24 through the throat 25 of port 19 adjacent the exit of guideway 24 into throat 25 upon movement of shutter 26 relative to hopper bottom 13. Each of the openings 27 also has a left-side edge 31, a back edge 32 and a right-side edge 33, the left side edge forming a sharp angle with front edge 30 so that an effective discharge opening 34 of varying area is formed upon relative movement of the shutter with respect to the hopper bottom from the right to the left. When the effective discharge opening is at its maximum discharge area, the right-side edge 33 of opening 27 substantially registers with the right side edge 23 of port 19 and the back edge 32 of opening 27 substantially registers with the back edge 26 of port 19, see Figs. 4 and 5, and it will also be noted that the penetrating means or fingers 20 pass through or over discharge port 34 at an intermediate point or path, substantially spaced from both margins 22 and 23.

The port 19 is also so located that the centerline of hopper bottom 13 passes through the throat 25 adjacent the exit of guideway 24 into throat 25 so that the fingers 20 achieve their maximum penetration of port 19 after they have passed through guideway 24 and in the area of throat 25 wherein effective discharge opening 34 is formed. The fingers 20 are also formed of a length such that they will not penetrate into opening 27 which it will be appreciated would prevent relative movement of shutter 26 with respect to hopper bottom 13.

In reviewing applicant's novel arrangement of discharge port 19 and opening 27 whereby a uniform predetermined distribution of fertilizer can be effected, it will be appreciated that the effective discharge opening 34 is formed in the throat 25 of port 19 and not in the guideway 24 and that the guideway is effective for permitting maximum penetration of the throat 25 by fingers 20 as well as for directing the fingers to move in a path substantially midway between the right and left side edges 22 and 23. It will be appreciated, therefore, that effective discharge opening 34 is penetrated by fingers 20 along its entire length and substantially midway of its width so that cohesive material which might form a film across this opening is thoroughly and effectively driven through.

While applicant's invention is directed primarily toward the arrangement of discharge ports and discharge openings, it will be appreciated that hopper 16 would normally include suitable end plates for enclosing the hopper and that the spreader would normally be wheel supported for movement over the ground and that these wheels would preferably be drivingly connected with shaft 15 whereby a uniform predetermined distribution of material would be dispensed irrespective of the speed of travel of the spreader. It will also be appreciated that suitable means can be provided for conveniently shifting shutter 26 relative to hopper bottom 13 for regulating the amount of material dispensed.

While the present invention has been particularly described with respect to the dispensing of fertilizer material of the type which has a tendency to clog and form a film across the discharge ports, the principles of the invention are also applicable for the dispensing of material such as the seeds of grains, grasses, and legumes.

What is claimed is:

1. A discharge port arrangement for a spreader of the type having penetrating means constrained to move in a circular path for entering said discharge port and forcing material through an effective discharge opening, said arrangement comprising a hopper bottom having formed therein a discharge port which includes a throat portion located adjacent the point of deepest penetration of said penetrating means, a guideway extending from said throat portion in the plane of said penetrating means a distance sufficient to receive and direct said penetrating means into said throat portion, said throat portion leading into enlarged opening providing margins spaced from said penetrating means on either side thereof, and a shutter movable along the bottom of said hopper and having an opening formed therein adapted to register with said throat portion in varying degrees.

2. A discharge port arrangement for a spreader of the type having penetrating means constrained to move in a circular path for entering said discharge port and forcing material through an effective discharge opening, said arrangement comprising a hopper bottom having formed therein a discharge port which includes a throat portion located adjacent the point of deepest penetration of said penetrating means and a guideway extending from said throat portion in the plane of said penetrating means a distance sufficient to receive and direct said penetrating means into and across said throat portion in a path substantially midway of the width of said throat portion, said throat portion leading into an enlarged opening providing margins spaced from said penetrating means on either side thereof, and a shutter movable along the bottom of said hopper and having an opening formed therein adapted to register with said throat portion in varying degrees.

3. A discharge port arrangement for a spreader of the type having penetrating means constrained to move in a circular path for entering said discharge port and forcing material through an effective discharge opening, said arrangement comprising a hopper bottom having formed therein a discharge port which includes a throat portion located adjacent the point of deepest penetration of said penetrating means and a guideway extending from said throat portion in the plane of said penetrating means a distance sufficient to receive and direct said penetrating means into said throat portion, said throat portion leading into an enlarged opening providing margins spaced from said penetrating means on either side thereof, the plane of said penetrating means substantially bisecting said discharge port, and a shutter movable along the bottom of said hopper and having an opening formed therein adapted to register with said throat portion in varying degrees, said opening having an edge constrained to move in a path substantially normal to said guideway across said throat portion adjacent the point of deepest penetration of said penetrating means.

4. An arrangement of discharge ports for a spreader comprising a hopper bottom which has formed therein a discharge port having a throat portion and a guideway opening into said throat portion, the plane of said guideway passing substantially through the center of the width of said throat portion, and a shutter slidable along the bottom of the hopper and having formed therein a discharge opening, said opening having an edge constrained to move in a path substantially normal to said guideway and an edge disposed at an acute angle to the first edge positioned to pass across said throat portion by reason of sliding of said shutter in one direction whereby an effective discharge opening of varying size can be formed in said throat portion exclusively of said guideway.

5. An arrangement of discharge ports for a spreader comprising a hopper bottom which has formed therein a discharge port having a throat portion and a guideway opening into said throat portion, the plane of said guideway passing substantially through the center of the width of said throat portion, and a shutter slidable along the bottom of the hopper and having formed therein a discharge opening positioned to register with the port in said hopper, said opening having an edge constrained to move in a path substantially normal to said guideway across said throat portion adjacent said guideway and an adjacent edge which forms an acute angle with respect to the last mentioned edge so as to provide a small opening, and which adjacent edge, by reason of movement of said slide in one direction, passes gradually cross the throat portion whereby an effective discharge opening of varying size can be formed in said throat portion.

6. An arrangement of discharge ports for a spreader comprising a substantially semi-circular hopper bottom which has formed therein a discharge port having a throat portion and a guideway opening into said throat portion, the plane of said guideway passing substantially through the center of the width of said throat portion, and a shutter slidable along the bottom of the hopper and having formed therein a discharge opening positioned to register with the port in said hopper, said opening having an edge constrained to move in a path across said throat portion adjacent the intersection of a vertical plane through the center line of said hopper, and an adjacent edge which forms an acute angle with respect to the last mentioned edge so as to provide a small opening, and which adjacent edge, by reason of movement of said slide in one direction, passes gradually across the throat portion whereby an effective discharge opening of varying size can be formed in said throat portion.

7. A feeder construction for a spreader of the type including an elongated hopper disposed transversely of the direction of movement of the spreader and having a bottom portion substantially semicircular in cross section and extending generally throughout the length of the hopper, which bottom portion is so shaped as to provide a plurality of openings, a rotor over each opening and having a radius less than that of the curvature of said bottom portion and having a plurality of fingers so disposed as to enter said openings by reason of rotation of said rotor, each of said openings providing a throat portion, located adjacent the point of deepest penetration of said fingers and a relatively narrow guideway extending from said throat portion in the plane of rotation of said fingers a distance sufficient to receive and direct said fingers into said throat portion, each of said openings being substantially enlarged beyond said point of deepest penetration as related to said guideway to provide substantial clearance on both sides of the plane of rotation of said fingers, and a shutter movable along the bottom of said hopper and having openings therein positioned to register with the openings in said hopper, the last-mentioned openings each being formed with an edge constrained to move, as a result of shifting of said shutter, across said throat portion substantially normal thereto, and said last-mentioned openings each having an adjacent edge which forms an acute angle relatively to the last-mentioned edge so as to provide a corner portion which first registers with said throat for a small opening upon first movement of said slide in one direction, and which adjacent edge, upon further movement of said slide, passes gradually across the enlarged portion of the hopper opening to provide an enlarged hopper discharge port.

References Cited in the file of this patent

UNITED STATES PATENTS

| | | |
|---|---|---|
| 2,510,231 | Juzwiak | June 6, 1950 |
| 2,670,883 | Ajero | Mar. 2, 1954 |
| 2,715,482 | Juzwiak | Aug. 16, 1955 |